US011238527B2

(12) United States Patent
Hahn et al.

(10) Patent No.: US 11,238,527 B2
(45) Date of Patent: Feb. 1, 2022

(54) SYSTEM AND METHOD OF PROVIDING A BENEFIT

(71) Applicants: Einat Steklov Hahn, New York, NY (US); Rishi Kumar, New York, NY (US)

(72) Inventors: Einat Steklov Hahn, New York, NY (US); Rishi Kumar, New York, NY (US)

(73) Assignee: KASHABLE LLC, New York, NY (US)

(*) Notice: Subject to any disclaimer, the term of this patent is extended or adjusted under 35 U.S.C. 154(b) by 332 days.

(21) Appl. No.: 14/508,587

(22) Filed: Oct. 7, 2014

(65) Prior Publication Data
US 2016/0098792 A1 Apr. 7, 2016

(51) Int. Cl.
G06Q 40/02 (2012.01)
G06Q 40/00 (2012.01)

(52) U.S. Cl.
CPC .......... *G06Q 40/025* (2013.01); *G06Q 40/00* (2013.01)

(58) Field of Classification Search
CPC ........ G06Q 40/08; G06Q 30/02; G06Q 40/00; G06Q 40/025
See application file for complete search history.

(56) References Cited

U.S. PATENT DOCUMENTS

| | | | | |
|---|---|---|---|---|
| 2004/0064332 A1* | 4/2004 | Zou | ................... | G06Q 10/1057 705/30 |
| 2005/0256794 A1* | 11/2005 | Colby | ................... | G06Q 40/00 705/35 |
| 2008/0033789 A1* | 2/2008 | Shindoh | ............. | G06Q 30/0201 705/7.29 |
| 2009/0150189 A1* | 6/2009 | Barron, Jr. | ............. | G06Q 40/00 705/4 |
| 2010/0223099 A1* | 9/2010 | Johnson | ................. | G06Q 30/02 705/7.28 |
| 2011/0145023 A1* | 6/2011 | Stahl | ....................... | G06Q 30/02 705/4 |
| 2011/0238451 A1* | 9/2011 | Bazzani | ................. | G06Q 40/08 705/4 |
| 2013/0054489 A1* | 2/2013 | Armand | ................. | G06Q 40/06 705/36 R |

(Continued)

FOREIGN PATENT DOCUMENTS

WO WO-2004034210 A2 * 4/2004 ............. G06Q 10/10

OTHER PUBLICATIONS

Andrew Webb. A Transitory Interface Component for the In-Context Visualization and Adjustment of a Value. Thesis submitted to the Office of Graduate Studies of Texas A&M University. Aug. 2007. (Year: 2007).*

*Primary Examiner* — Virpi H Kanervo
(74) *Attorney, Agent, or Firm* — Hassan Abbas Shakir; Shakir Law PLLC

(57) ABSTRACT

A benefit-provision system is operated by an administrator to provide a benefit from a source, which may be an administrator, to a benefit-eligible recipient who is part of or associated with a sponsored applicant group for which access to the benefit-provision system is being sponsored by a sponsor. A method thereof provides a benefit by an administrator from a source to a benefit-eligible recipient who is part of or associated with a sponsored applicant group for which access to a benefit-provision system is being sponsored by a sponsor.

39 Claims, 5 Drawing Sheets

(56) References Cited

U.S. PATENT DOCUMENTS

2013/0159194 A1* 6/2013 Habib .................... G06F 21/32
　　　　　　　　　　　　　　　　　　　　　　705/66
2013/0253959 A1* 9/2013 Read ..................... G06Q 40/02
　　　　　　　　　　　　　　　　　　　　　　705/4

* cited by examiner

US 11,238,527 B2

SYSTEM AND METHOD OF PROVIDING A BENEFIT

BACKGROUND OF THE INVENTION

1. Field of the Invention

The invention is directed to a sponsored benefit-provision system, specifically a benefit-provision system operated by an administrator to provide a benefit from a source to a benefit-eligible recipient who is part of or associated with a sponsored applicant group for which access to the benefit-provision system is being sponsored by a sponsor; and a method thereof.

2. Description of the Related Art

Lower and middle income employees are able to leverage advantageously the group power of a stable employer or a large union to source for services such as healthcare, retirement savings plans, life insurance. In contrast, banking and financial services are typically provided not on a group basis but on an individual's financial performance or strength that is usually reflected as a "credit score."

This traditional method of underwriting by financial institutions has created a very large group of individuals that have limited access to banking and financial services. According to one study by Federal Deposit Insurance Corporation (FDIC),
- 28.3% of U.S. households are unbanked or underbanked,
- 24 million U.S. households with 51 million adults are unbanked or underbanked,
- 25% of U.S. households used at least one alternative financial services product in the last year, and
- 12% of U.S. households used at least one alternative financial services product in the last month.

A study by the Consumer Financial Protection Bureau (CFPB) found that in the U.S. the predatory lending and related practices resulted in small loans and high fees. The mean loan amount was $392 for 18.3 days and an interest rate of 339% APR (annual percentage rate). The loan volume was $48 billion and fees were $9 billion.

These differences are clearly indicative that middle income persons, even when they are regularly employed, are missing out on services that can affect their lives. It is also clear that there is a need in the marketplace for a better solution for access to financial services, especially credit.

Thus, what is needed is a system and method of providing a benefit to one or more eligible recipients who are difficult to reach using traditional systems and methods. In particular what is also needed is a new system to reach that segment of the population and a reliable method of providing better, faster, cheaper access to credit to one or more eligible recipients who are difficult and expensive to reach using traditional systems and methods.

SUMMARY OF THE INVENTION

These and other needs are met by the present invention.

Therein, in accordance with one or more embodiments of the present invention, broadly, a benefit-provision system is operated by an administrator to provide a benefit from a source to a benefit-eligible recipient who is part of or associated with a sponsored applicant group for which access to benefit-provision system is being sponsored by a sponsor. A benefit-provision method is a method of operating the benefit-provision system to provide a benefit to benefit-eligible recipient.

More particularly, in accordance with one or more embodiments of the present invention a lending system provides the benefit of a loan from a source to a benefit-eligible recipient who is a benefit-eligible employee. Preferably, the benefit-provision system is workplace related. The sponsored applicant group may be defined as a sponsored workforce of a sponsor who is one or more employers. The organizational sponsors access to the lending system in order to provide a further benefit, especially a payroll benefit, for the sponsored workforce. A benefit-provision method may be configured as a lending method. The sponsor may be any suitable type of sponsor including a professional association, a labor union, an employer organization, an employer, and the like.

DETAILED DESCRIPTION OF THE INVENTION

In the following description, reference is made to the accompanying drawings that form a part of the present application. The drawings show one or more embodiments in which the invention may be practiced. It is to be understood that other embodiments may be utilized and changes may be made without departing from the scope of the present invention. Where an item or step is described in the singular, the plural items or steps may be used. Where items or steps are described in the plural, the singular item or step may be used.

Figure 1:
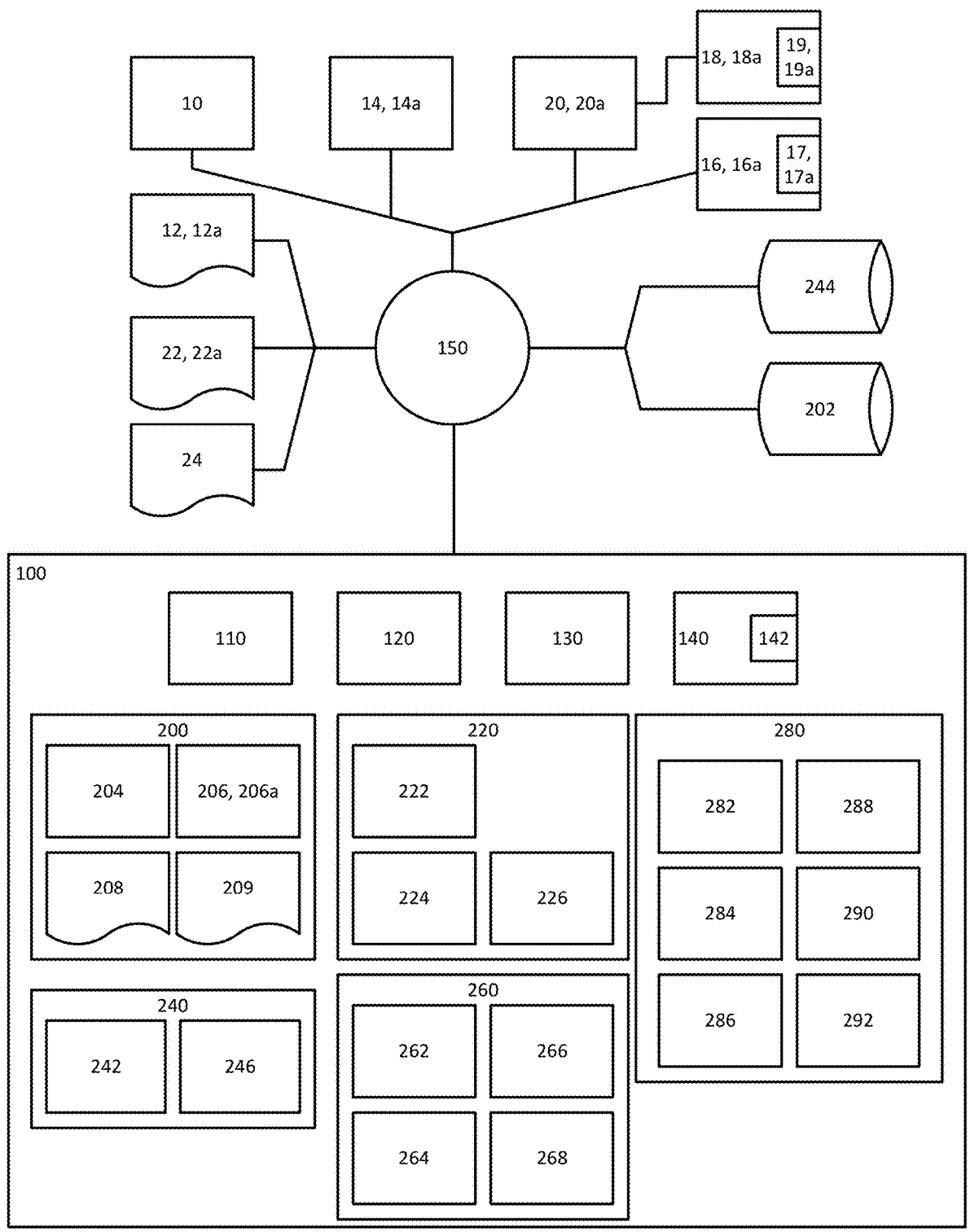
FIG. 1 is a schematic view of an internet-based system to provide a benefit to an eligible recipient from an eligible-recipient or underserved group in accordance with one or more embodiments of the present invention.
Figure 2:
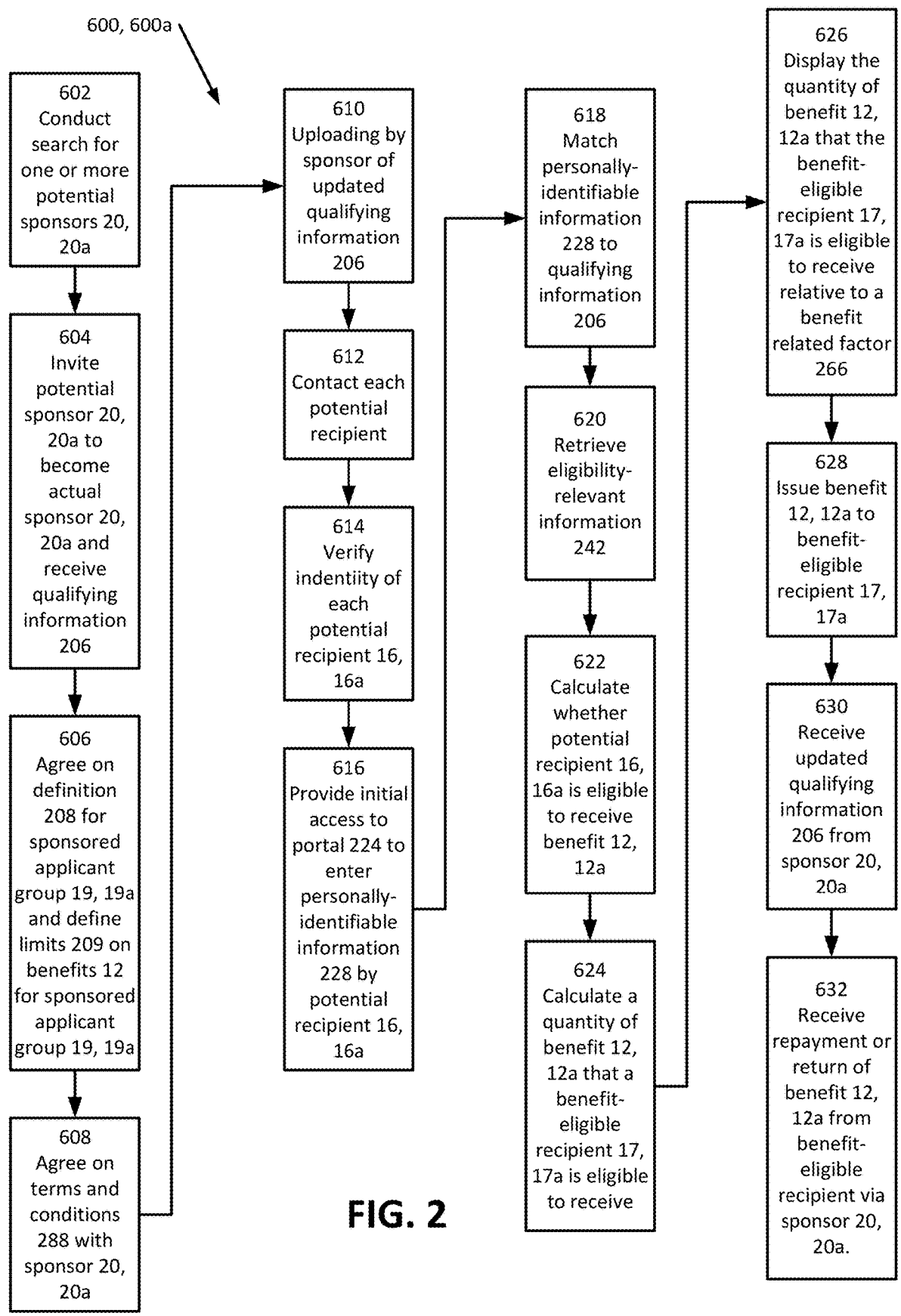
FIG. 2 is a schematic view of a method of performing the steps of the system of FIG. 1 in accordance with one or more embodiments of the present invention.

FIG. 1 is a schematic view of an internet-based system to provide a benefit to an eligible recipient from an eligible-recipient or underserved group in accordance with one or more embodiments of the present invention. FIG. 2 is a schematic view of a method of performing the steps of the system of FIG. 1 in accordance with one or more embodiments of the present invention.

In accordance with one or more embodiments of the present invention, broadly, a benefit-provision system 100 is operated by an administrator 10 to provide a benefit 12 from a source 14 to a benefit-eligible recipient 17 who is part of or associated with a sponsored applicant group 19 for which access to benefit-provision system 100 is being sponsored by a sponsor 20. A benefit-provision method 600 is a method of operating benefit-provision system 100 to provide benefit 12 to benefit-eligible recipient 17.

More particularly, in accordance with one or more embodiments of the present invention a lending system 100a provides the benefit of a loan 12a from a source 14a to a benefit-eligible recipient who is a benefit-eligible employee 17a. The sponsored applicant group may be defined as a sponsored workforce 19a of a sponsor who is one or more employers 20a. Employer 20a sponsors access to lending system 100a in order to provide a further benefit, especially a payroll benefit, for the sponsored workforce 19a. Benefit-provision method 600 may be configured as lending method 600a.

Benefit-provision system 100 is accessible by a plurality of invited and/or authorized system users, collectively and individually "system participants," and operates through one or more communications networks using one or more system hardware accessible by the system participants.

Administrator 10 may be any suitable individual, entity, group, organization, governmental unit, group, and/or combination thereof that operates in whole or in part benefit-provision system 100 and/or practices benefit-provision method 600 directly or indirectly, alone or in combination with one or more other administrators, affiliates, subsidiaries, agents, associates, contractors, surrogates, and/or a combination thereof. Administrator 10 preferably limits access to the system to one or more system participants. Thus, administrator 10 functions as a gate keeper to both benefit-provision system 100 and benefit-provision method 600.

Benefit 12 may be any suitable benefit that may be tangible, intangible, physical, spiritual, financial, holistic, and/or ephemeral and, preferably, each of which has its own unique advantages in being provided by system 100. Benefit 12 may be a benefit that has to repaid or returned. Therein, the repayment or return would be in kind, with interest, or with a reduction in the principle.

In particular, the advantage of having benefit 12 provided by system 100 is that administrator can take into consideration the recipient's history in using the benefit in system 100 and, where repayment or return is required as part of receiving benefit 12, the recipients history in making repayments and/or returns.

For example, benefit 12 may be a subsidized or unsubsidized internet-delivered computer code for making reduced-price purchases on the internet, in physical retail locations, or both for the enjoyment and/or savings of one or more benefit-eligible recipients 17. Benefit 12 may also be a subsidized or unsubsidized internet-delivered access code for tangible or non-tangible goods, e.g., music, media, for the enjoyment of one or more benefit-eligible recipients 17; health management guidance, e.g., weight management guidance for the health-related benefits of the one or more benefit-eligible recipients 17; and/or a combination of the above.

The substantial subject matter of benefit 12 is preferably provided by source 14. Source 14 may be any suitable individual, entity, group, organization, governmental unit, group, and/or combination thereof that in whole or in part provides the substantive subject matter of benefit 12 for benefit-provision system 100 and/or benefit-provision method 600 directly or indirectly, alone or in combination with one or more other sources, affiliates, subsidiaries, agents, associates, contractors, surrogates, and/or a combination thereof.

Herein, the substantial subject matter of benefit 12 is the portion of benefit 12 that is beneficial to benefit-eligible recipient 17 regardless whether the substantial subject matter is directly and/or indirectly provided to benefit-eligible recipient 17. For example, if benefit 12 is a subsidized or unsubsidized internet-delivered computer code for making reduced-price purchases on the internet and/or in physical retail locations, the substantial subject matter of benefit 12 is the subsidized amount and/or the difference between a regular-price purchase and a reduced-price purchase for the same or similar goods. This substantial subject matter of benefit 12 may be provided directly to benefit-eligible recipient 17; for example, as a rebate or a coupon for the goods. In the alternative or in addition, the substantial subject matter of benefit 12 may be provided indirectly to benefit-eligible recipient 17, for example, as an advantageous financing agreement in favor of administrator 10 for the wholesale purchase of the goods.

A potential recipient 16 is a member of at least one applicant group 18. A recipient 16 may be one or more individuals, one or more legal entities, and/or combination thereof regardless if they are known to each other or not, are organized and/or unorganized, associated with each other and/or distinct from each other; and/or combination thereof, whether they are paid by one or more sponsors 20 or not, or conversely regardless of whether recipient 16 pays dues, fees, or remuneration of any kind in money, labor, time, devotion, and/or combination thereof to sponsor 20. Until recipient 16 is qualified to receive benefit 12, recipient 16 is a potential recipient. Once recipient 16 is qualified to receive benefit 12, the recipient becomes a benefit-eligible recipient 17.

An applicant group 18 preferably is directly associated with at least one sponsor 20; for example employees and employer, respectively. However, applicant group 18 does not need to be associated with a sponsor until the sponsor decides to sponsor the applicant group, at which time applicant group 18 or a subset of applicant group 18 becomes sponsored applicant group 19.

Moreover, an applicant group 18 may be subgroup of a larger population group that may or may not be directly or indirectly associated with one sponsor 20. For example, applicant group 18 may be the subgroup of all full-time employees selected from the group of all employees including part-time and full-time employees working for one employer and when sponsored by sponsor 20 becomes sponsored applicant group 19.

Sponsor 20 may be any suitable entity such as any suitable individual, entity, group, organization, governmental unit, group, and/or combination thereof; but especially one or more business employers; one or more social clubs; one or more political, religious, and/or business associations; one or more social service organizations, one or more civil-society organizations; one or more religious organizations; and/or a combination thereof.

In accordance with one or more embodiments of the present invention, benefit-provision system 100 may be a lending system 100a. However, benefit-provision system 100 is not limited a lending system, but rather is suitable in other circumstances now known, not yet developed, and/or needed in the future to provide a benefit from a source to an eligible-recipient or underserved group.

The system participants, system hardware, and system software in lending system 100a and lending method 600a may be interchangeable with the system participants, system hardware, and system software in benefit-provision system 100 and benefit-provision method 600. However, as applicable to lending system 100a and lending method 600a, certain system participants, system hardware, and system software may have in the alternative or in addition certain other characteristics and/or functions; thus, features in system 100a and/or method 600a, when applicable or advantageous to lending system 100a and/or method 600a are identified by a more readily understood name and/or by the suffix "a" added to reference numeral of like features of system 100 or method 600 e.g., 12*a*, 14*a*, etc.

Lending system 100*a* provides the benefit of a loan 12*a* from a source 14*a* to a benefit-eligible recipient who is a benefit-eligible employee 17*a*. The sponsored applicant group may be defined as a sponsored workforce 19*a* of a sponsor who is one or more employers 20*a*. Employer 20*a* sponsors access to lending system 100*a* in order to provide a further benefit, especially a payroll benefit, for the sponsored workforce 19*a*.

As explained sponsored workforce 19*a*, may be underserved, i.e., underbanked, because the sponsored workforce is at least in part difficult to reach without a communications network 150, such as the internet, due to their lack of a stable and long-lasting permanent mailing address due their particular socio-economic demographics, part-time or seasonal nature of employment, or other factors.

Source 14*a* in particular may be one or more banks, investors, investment pools, lending institution, civil-service organizations, religious organizations, social clubs, and/or the administration a combination thereof. Therein, source 14*a* provides the substantial benefit of loan funding provided as money, loan guarantees, loan repurchase agreement, loan release; loan adjustment, physical and/or electronic gift cards to online retailers and/or a combination thereof.

Recipient 16 may be an employee 16*a* who is a member of the workforce 18*a* of at least one employer 20*a*. Employee 16*a* is not intended to be limited to a strict definition of employee, but only illustrates the most likely recipient 16 in lending system 100*a*. Employee 16*a* may be anyone having any suitable status whether full-time, part-time, seasonal, temporary, salaried, commissioned, hourly, on-call, and/or combination thereof as an employee, manager, partner, investor and/or a combination thereof. Until an employee is qualified to receive loan 12*a*, employee 16*a* is a potential recipient. Once employee 16*a* is qualified to receive benefit 12*a*, the employee becomes a benefit-eligible employee 17*a*.

Moreover, a benefit-eligible recipient 17 in benefit-provision system 100 or 100*a* may be a person associated with a benefit-eligible employee 17*a* by being a legal dependent, a spouse, and/or any person authorized by and/or authorized for benefit-eligible employee 17*a*. Such a derivative recipient may be in itself be a recipient 16 in lending system 100*a* and one or more derivative recipients may in of themselves comprise an applicant group 18 in lending system 100*a*. Thus, while employee 16*a* and workforce 18*a* will be used with respect to lending system 100*a*, these may include derivative recipients and their applicant group, respectively.

Workforce 18*a* is also not intended to be limiting, but only illustrates the most likely applicant group 18 in lending system 100*a*. Workforce 18*a* may be comprised of one or more employees 16*a* in one or more job categories employed by at least one employer 20*a*. Workforce 18 may be selected in whole or in part anyone having any suitable status whether full-time, part-time, seasonal, temporary, salaried, hourly, on-call, and/or combination thereof as an employee, manager, partner, investor and/or a combination thereof regardless of the legal status of employer 20*a*.

Employer 20*a* is also not intended to be limiting, but only illustrates the most likely sponsor 20 in lending system 100*a*. Employer 20*a* may be any entity having any status whether a non-profit, for-profit, association, service organization, governmental department, agency, or authority, and/or a combination thereof.

In the alternative or in addition, workforce 18*a* may be comprised of the workforces of a plurality of employers 20*a* that comprise or consist of one or more business entity and/or its associated, subsidiary, related, or commonly owned companies or employers having one or more commonalities such as location in a regional area, industry association, business size, legal status, and/or combination thereof.

Workforce 18*a* becomes a sponsored applicant group, i.e., a sponsored workforce 19*a*, when sponsored by one or more employers 20*a*.

The system participants in benefit-provision system 100 or system 100*a* are not limited to the enumerated system participants. System participants should be interpreted broadly to encompass any individual, entity, and/or organization that may have need to access system 100. Moreover, the system participants need not necessarily be separate and/or unaffiliated from each other. Thus, for example, administrator 10 may also be source 14 and/or be an affiliate of the sponsor 20.

For example, as applicable to lending system 100*a*, an auditor or accountant may have need to access lending system 100*a* to conduct necessary accounting functions and, thus, is also an authorized system participant. In another example, applicable to lending system 100*a*, one or more regulatory agencies and/or consumer protection agencies may also be an authorized system participant and use benefit-provision system 100 and benefit-provision method 600.

Benefit-provision system 100 comprises one or more system participant terminals 110, one or more application interface system 120, one or more associated systems 130, and/or one or more data centers 140, collectively and individually "system hardware," all of which are preferably interconnected via one or more communications networks 150 that execute one or more functional units 200-299, collectively and individually "system software," to perform a benefit-provision method 600.

Each system hardware comprises or consists of one or more computing devices usable by one or more system participants directly and/or indirectly, actively and/or passively for one or more suitable functions related to benefit 12, system 100, and/or benefit-provision method 600. The system hardware may preferably be a personal computer, a laptop, a tablet computer, a smartphone, and/or any other suitable device and may also be a networked computing device, a server, or the like.

Each system hardware executes one or more software for suitable functional usage of the system hardware and system software specifically for performing one or more functional units 200-299 in whole or in part of benefit-provision system 100 and/or benefit-provision method 600 and/or for interfacing with another system hardware via the one or more communications networks. System software is preferably stored on one or more non-transitory computer-readable memory and/or media of the system hardware and/or of an accessible computing device associated with one or more system hardware.

Therein, "computing device" is intended in this application for all purposes to be interpreted broadly and is defined for all uses, all devices, and/or all system participants of benefit-provision system 100 in this application as a device comprising at least a central processing unit that carries out the instructions of one or more computer programs associated with benefit-provision method 600 by performing arithmetical, logical, and input/output operations to accomplish in whole or in part one or more steps of benefit-provision method 600; a communications device for interfacing with a data network such as communications network 150 and/or interfacing with benefit-provision system 100 and/or one or more system participants; and/or a non-transitory computer-readable memory and/or media.

"Non-transitory computer-readable memory" or "non-transitory computer-readable media" may be a hard drive, solid state drive, compact disk drive, and/or DVD drive for storing the one or more computer programs.

One or more system participant terminals 110 may be any kind of suitable computing device capable of accessing benefit-provision system 100 transacting one or more full or partial steps of benefit-provision method 600; monitoring one or more steps of benefit-provision method 600; retrieving data related to benefit-provision system 100 and/or benefit-provision method 600; authorizing in part or in full one or more steps of benefit-provision method 600; supervising one or more other participant terminals 110, acting as a back-up to another participant terminal 110; performing accounting related to benefit 12, system 100, and/or benefit-provision method 600; retrieving data used in one or more suitable functions related to benefit 12, system 100, and/or benefit-provision method 600.

One or more application interface system 120 may be any suitable system comprising one or more computing devices and that provides an interface between one or more system participants, one or more system hardware, and/or system software, in particular the functional units. Therein, an application interface system 120 may be suitable hardware, such as a web server executing one or more application programming interface (API) software to deliver data from one or more data centers 140 to a system participant accessing system 100, 100a through a system terminal 110 and providing data relevant and/or limited to that system participant.

One or more associated systems 130 may be may be any suitable system comprising one or more computing devices and that is associated with a system participant in the alternative or in addition to participant terminal 110. For example, a participant terminal 110 may be a personal computer at an employer 20a that accesses associated system 130 of a human resources system at that employer. In another example, associated system 130 may be a money transfer system at a vendor to effect a transfer of loan funds to a bank where benefit-eligible employee 17a maintains his/her bank account.

One or more data centers 140 may be any suitable system comprising one or more computing devices and may comprise a plurality of databases comprising data associated with benefit-provision system 100 and/or method 200 on one or more non-transitory media such as a hard drive, solid state drive, compact disk drive, and/or DVD drive. As is necessary, each non-transitory media may be associated with one or more computing devices. Moreover, one or more databases may be stored to be redundant on multiple non-transitory media and any single database may be stored on a plurality of non-transitory media using RAID database architecture. One or more databases may also be configured to any suitable database architecture such as relational database architecture, non-relational database architecture, hierarchical architecture, object modeling architecture, and/or core architecture data model and have one or more encryption at a software and/or hardware level to guard against intrusion and/or misuse.

Each data center 140 in whole or in part may be subdivided into one or more virtual data rooms 142 limited to data associated with one or more system participants as specified by one or more system participants, preferably administrator 10. Therein, virtual data room 142 comprises an online repository of information or data space used for the storing and distribution of documents by one or more an online file sharing and personal cloud content management service for businesses. In accordance with one or more embodiments of the present invention, virtual data room 142 may be a data room and/or database at sponsor 20. In accordance with one or more embodiments of the present invention, virtual data room 142 comprises a database.

Communications network 150 is preferably the internet. In the alternative or in addition, communications network 150 may be one or more other networks, including proprietary, private, intra-net, satellite, cellular, temporary, permanent, and/or telephone networks and/or a combination thereof now known or yet to be developed.

Regardless of the specific system and/or method, where one system participant is described, a plurality of system participants may be used and vice versa. Where one system hardware is described, a plurality of system hardware may be used and vice versa. Where one system software is described, a plurality of system software may be used and vice versa.

A benefit-provision method 600 comprises a plurality of steps for performing benefit-provision system 100 in accordance with one or more embodiments of the present invention. Benefit-provision method 600 may be configured as lending method 600a. Method 600 preferably proceeds in order from one enumerated step to a sequentially enumerated step. However, where necessary and/or desired, one or more steps may be performed out of sequence.

A benefit-provision method 600 comprises a plurality of steps for using benefit-provision system 100. In a first step 602, administrator 10 uses a qualification unit 200 to conduct an automated search through one or more databases 202 to determine if one or more potential sponsors 20 that meet a predetermined initial qualification score 204 (IQS). Therein, qualification unit 200 analyzes each database 202 for one or more initial criteria 206. If criteria 206 is not directly found in database 202, qualification unit 200 calculates the respective value of criteria 206 from other information in one or more databases 202.

Database 202 may be any suitable public, private, governmental, and/or proprietary database or a combination thereof. Due to the speed at which the information in database 202 may change, the databases are preferably available through communication system 150, and in particular through the internet. In the alternative or in addition, database 202 is stored in one or more data centers 140 of benefit-provision system 100 or any other accessible system.

Qualification unit 200 uses initial criteria 204 to calculate in accordance with Equation 1 a potential sponsor 20 may be invited to become an actual sponsor 20. Therein, $$IQS=FS*F_1+NE*F_2-CH*F_3 \qquad \text{Equation 1}$$

where initial criteria 204 are
 FS is a measure of financial soundness;
 NE is the number of employees in a workforce 18a;
 CH is the churn in workforce 18a; and
where adjustment factors are
 $F_1$ is an adjustment factor applied to FS;
 $F_2$ is an adjustment factor applied to NE; and
 $F_3$ is an adjustment factor applied to CH.

Therein, if financial soundness FS is strong and/or number of employees NE is high while the churn CH is low, then the IQS is likely high and it is likely that potential sponsor 20 would be invited to become an actual sponsor.

Step 602 is performed by qualification unit 200 using the internet and/or is a computer-based step, because of the vast amounts of information required to be sifted and correlated could not be done correctly, efficiently, or timely, i.e., without having the instantly usefulness of the data expire, using non-internet and/or non-computer based methods. In the alternative or in addition, step 602 is required to be performed using the internet and/or is a computer-based step.

Financial soundness FE is measured according to public records, financial statements, bond ratings, and/or the like.

The number of employees NE may vary as the potential group of employees 18*a* is defined differently to include or exclude certain employees. Thus, step 602 may be performed multiple times for the same employer 20*a* to determine a best case scenario.

Churn CH of the number of employees in the potential group of employees 18*a*. Factors $F_1$, $F_2$, and $F_3$ may be used to enhance or decrease the value of initial criteria 204. That is if financial soundness FS is the most important aspect in one industry, then factor $F_1$ may be increased and factors $F_2$ and $F_3$ maybe decreased to normalize IQS and be able to compare multiple potential sponsors across different industries.

In order to proceed to step 604, employer 20*a* preferably has to achieve a predetermined minimum IQS score.

If the minimum IQS score is not achieved, step 602 is repeated with a different configuration applicant group 18 from the same potential sponsor. Thus, for example, an applicant group 18 that was defined as the entire workforce of a potential sponsor is redefined as the workforce in one particular location of the sponsor's business locations or one or more, but all, job categories of a sponsor's entire workforce. In the alternative or in addition, step 602 is repeated with another sponsor 20 or benefit-provision method 600 ends.

In step 604, a potential sponsor 20 that meets the predetermined criteria is invited by administrator 10 to qualify as an actual sponsor based on a proposed applicant group 18. If the potential sponsor accepts the invitation, the sponsor transfers to administrator 10 via communications network 150 qualifying information 206 that describes with detail each member of the proposed applicant group and optionally one or more underlying conditions of the sponsor.

For example, in lending system 100*a*, qualifying information 206*a* comprises census information regarding workforce 18*a*, which may be
  tenure of each employee, defined as the length of employment;
  wage rate paid over a defined period of time; and
  employment status, i.e., hourly, full-time, part-time, permanent, seasonal, temporary.

The underlying conditions of the sponsor may be any conditions that affect the proposed applicant group. For example, in lending system 100*a*, the underlying conditions of employer 20*a* may be layoffs or intent to conduct a layoff and/or employee churn.

In step 606, preferably, administrator 10 uses qualifying unit 200 and qualifying information 206 regarding the proposed applicant group to re-calculate the IQS score according to equation 1. If the IQS score using census information 30 does not exceed the predetermined minimum IQS score, benefit-provision method 600 ends.

If the IQS score using qualifying information 206 exceeds the predetermined minimum IQS score, administrator 10 may use qualifying unit 120 and qualifying information 206 to further define the proposed applicant group 18 or proceed with the previously defined applicant group as a proposed applicant group.

Since the proposed applicant group 18 may change during time, administrator 10 and sponsor 20 agree on a definition 208 for a sponsored applicant group 19. For example, in lending system 100*a*, administrator 10 and sponsoring employer 20*a* may agree that definition 208 defines all employees who are full-time employed in a certain business location and these employees will become sponsored workforce 19*a*.

Moreover, administrator 10 and sponsor 20 may agree on one or more limits 209 on benefit 12. Limit 209 may be applicable to sponsored applicant group 19 sponsored by sponsor 20 and/or to one or more potential recipients from sponsored applicant group 19 by sponsor 20. For example, if loan 12*a* is the benefit, limit 209 may be a numerical maximum loan limit or as a maximum percentage of the recipient's compensation that a potential recipient 16 may take out of its compensation and, thus, affect all members of sponsored workforce 19*a* sponsored by employer 20*a*. In the alternative or in addition, the loan may be limited to a factor of a particular wage rate for potential recipient 16 who may have been employed less than a stated time when the benefit is made.

In accordance with one or more embodiments of the present invention, limit 209 may result in a recipient 16 that is part of the sponsored applicant group 19 not to be eligible for benefit 12. For example, in the case of a benefit 12 that is a loan, a limit 209 may be that a minimum loan is made, yet another limit 209 would determine that recipient 16 would only be eligible for a maximum loan that is less than the minimum loan. Thus, applying a rule-based hierarchy, when maximum loan that is less than the minimum loan, recipient 16 would be ineligible for a loan, i.e., benefit 12.

In step 608, upon or after reaching an agreement, sponsor 20 agrees as part of the agreement to terms-and-conditions 288 for use of one or more features of system 100 and administrator 10 authorizes sponsor 20 to become an authorized system participant and creates one or more virtual data rooms 142 for sponsor 20 and/or for one or more particular sponsored applicant group 19. Instructions to sponsor 20 for how to access one or more features of system 100 and one or more features of method 600 are preferably provided via communications subsystem 282.

The agreement is preferably saved to data room 142. Upon or after reaching an agreement with sponsor 20 on the definition of the sponsored applicant group 19, definition 208 and limits 209 may also be saved, preferably, to the same virtual data room 142 as the agreement.

In step 610, sponsor 20 preferably uploads an updated version of qualifying information 206 to virtual data room 142 preferably via communications subsystem 282.

In step 612, sponsor 20 contacts each recipient 16 of sponsored applicant group 19 with one or more messages 222 via communications network 282. In accordance with one or more embodiments of the present invention, identification unit 220 automatically (or on instruction by the administrator) contacts each recipient 16 of sponsored applicant group 19 on behalf of sponsor 20 and/or administrator 10 with one or more messages 222 via communications network 282.

Message 222 may comprise an explanation in detail or in general of benefit 12, an explanation of one or more relevant portions of system 100, one or more instructions how to become an authorized system participant and/or how to become a benefit-eligible recipient 17, and/or any other relevant information including internet or intranet links to relevant information from administrator 10, sponsor 20, and/or source 14. Repeated messages 222 also may be sent at one or more predetermined time intervals via communications network 150 to remind one or more potential recipients 16 of the opportunities with regard to system 100.

In step 614, using identification unit 220, recipient 16 can choose to become an authorized system participant by following the instructions in message 222. Preferably, recipient 16 will be directed by message 222 or other relevant information to a recipient sign-up portal 224 operated preferably by administrator 10. Portal 224 may be an intranet website located on or generated by system application interface 120 disposed at administrator 10, sponsor 20, and/or a combination thereof and made available through communications network 150 to participant terminal 150 associated with potential recipient 16.

Figure 3A:
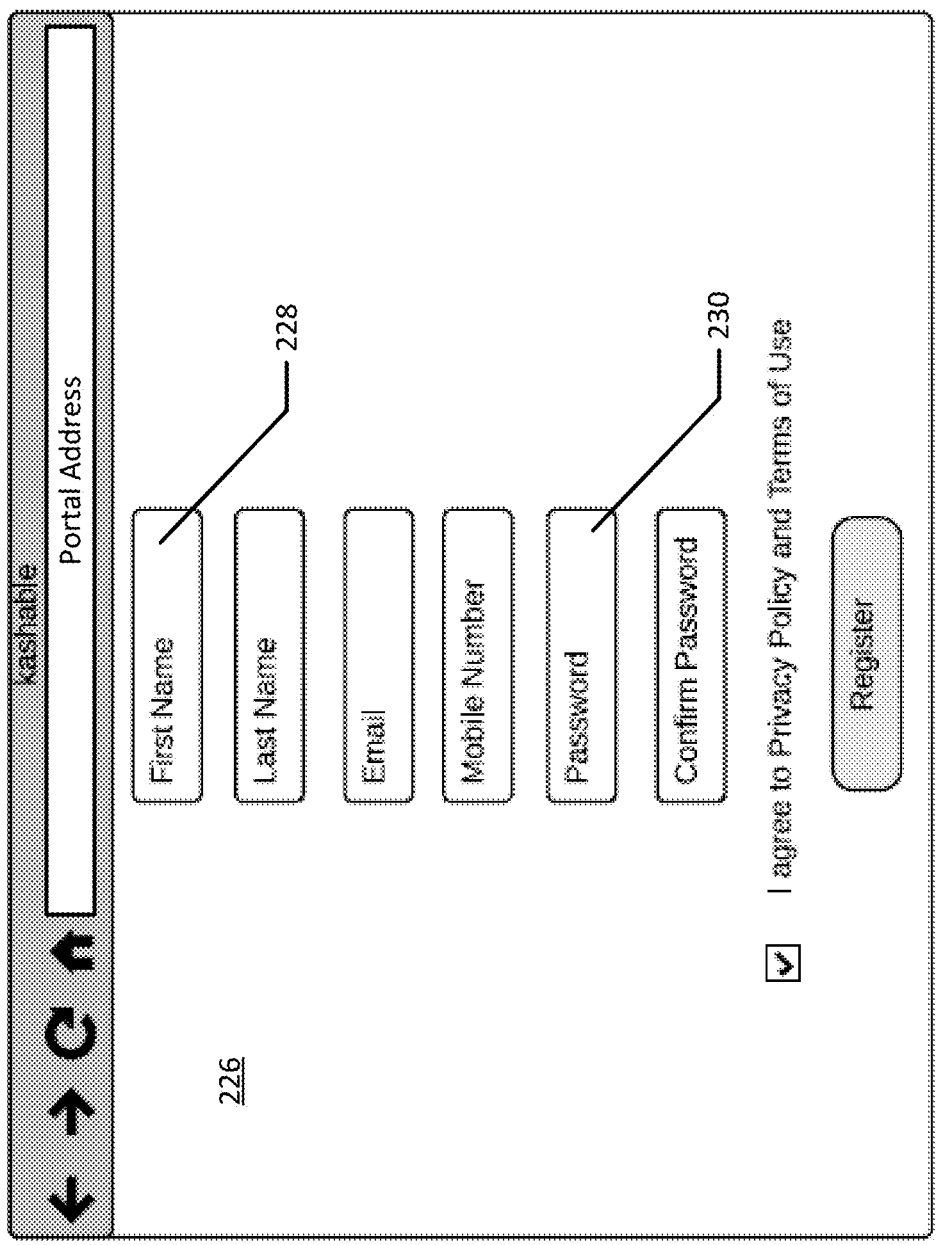
FIG. 3a is a schematic representation of a first display for a potential recipient to become an authorized system participant in the benefit-provision system in accordance with one or more embodiments of the present invention.
Figure 3B:
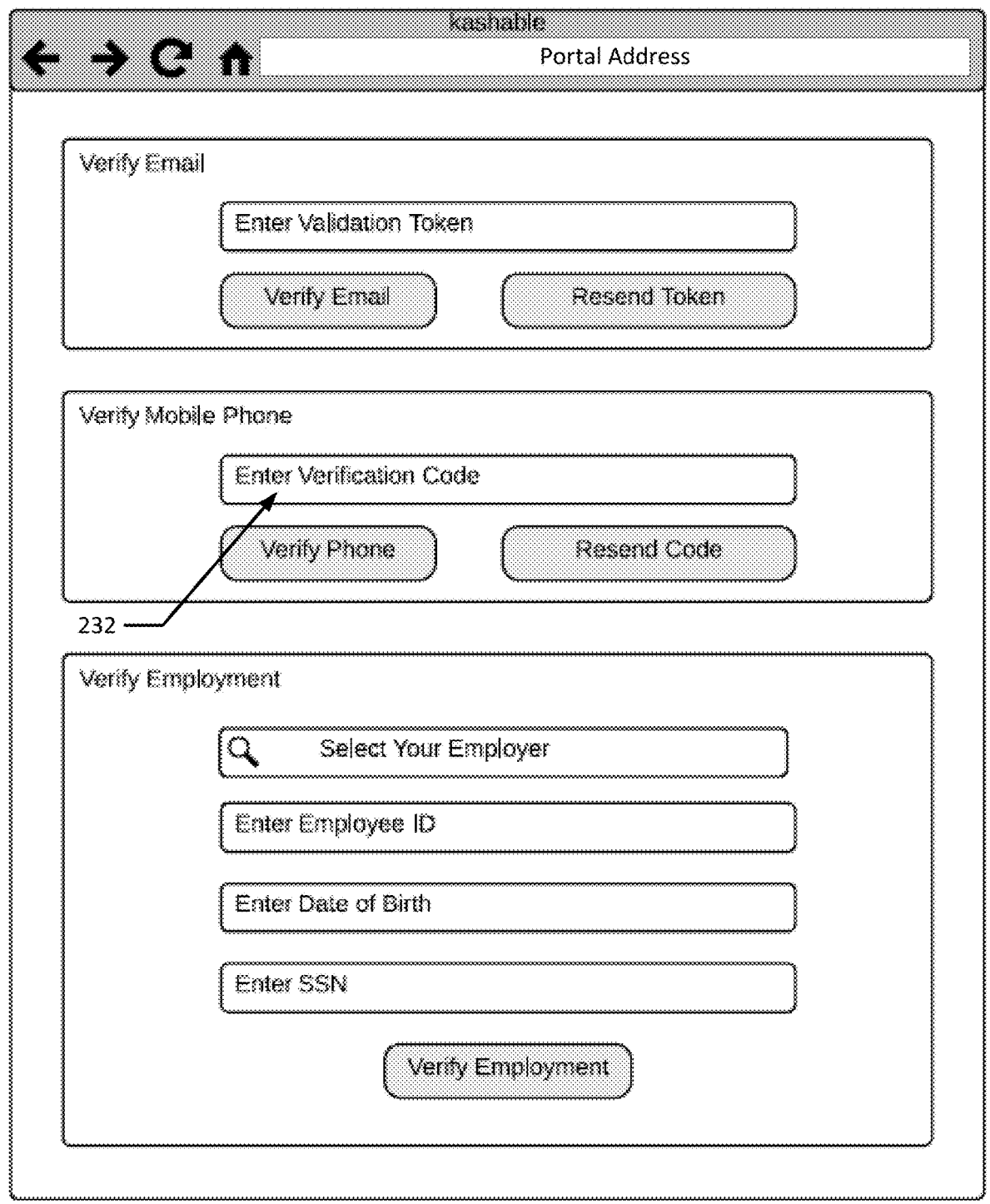
FIG. 3b is a schematic representation of a second display for a potential recipient to become an authorized system participant in the benefit-provision system in accordance with one or more embodiments of the present invention.

FIG. 3a is a schematic representation of a first display for a potential recipient to become an authorized system participant in the benefit-provision system in accordance with one or more embodiments of the present invention. FIG. 3b is a schematic representation of a second display for a potential recipient to become an authorized system participant in the benefit-provision system in accordance with one or more embodiments of the present invention.

Portal 224 will display one or more information pages 226 asking for any suitable personally-identifiable information 228. Information pages 226 may be suitable pages capable of displaying information to a recipient using participant terminal 110 and for entering and transmitting personally-identifiable information 228 by any suitable means to the portal for processing. Preferably, information pages 226 are one or more linked webpages generated by a webserver of system application interface 120.

The personally identifiable information may include, for example, name, mailing address, email address, phone number, employment information, and governmental identification numbers in order to establish a password protected user account 230 using user account subsystem 294.

In step 616, preferably portal 224 will confirm the identity of recipient 16 by using at least a double verification method, such as requiring the entry of an identification 232, such as a one-time numerical identification, text-based identification, or a combination thereof, sent by a communication method separate and distinct from the portal. The verification method may require a plurality of verification steps, messages, information typically inaccessible for others.

For example, the verification method may be sending a SMS (short message service) message to a cell phone by way of the cell phone number provided of the recipient in personally-identifiable information 228. Therein, step 614 may be repeated each time recipient 16 signs into his/her user account 230.

Personally-identifiable information 228 is preferably stored in virtual data room 142 associated with applicant group 19 to which recipient 16 is a member of or is associated and/or in virtual data room 142 associated with the sponsor of the applicant group.

In a step 618, recipient qualification unit 240 verifies that personally-identifiable information 228 matches the information associated with recipient 16 in qualifying information 206. If the qualifying information 206 does not match personally-identifiable information 228, potential recipient 16 is reverted to step 614 to correct the personally-identifiable information 228. If the one or more discrepancy persist or immediate after the discovery of the discrepancy, potential recipient 16 is invited via one or more communications from communications subsystem 282 to contact administrator 10, sponsor 20, and/or provided other information to aid in resolving the one or more discrepancies.

In a step 620, recipient qualification unit 240 uses one or more personally-identifiable information 228 to retrieve eligibility-relevant information 242 from a database 244. Database 244 may be any suitable public, private, governmental, and/or proprietary database or a combination thereof. Due to the speed at which the information in database 244 may change, the databases are preferably available through communication system 150, and in particular through the internet. In the alternative or in addition, database 244 is stored in one or more data centers 140 of benefit-provision system 100 or any other accessible system.

Eligibility-relevant information 242 may be any suitable information numeric, quantitative, and/or in narrative form that aids and/or enhances a determination of eligibility for benefit 12. Thus, eligibility-relevant information 242 may be information that verifies personally-identifiable information 228 provided by potential recipient 16, one or more information that expands personally-identifiable information 228 such as credit worthiness reports, demographic information related to one or more physical addresses of the recipient 16a, familial relationships, previous positive or negative experience and/or knowledge of potential recipient 16 by system 100, and/or any other information known about recipient 16. For example, database 244 may be a private or governmental identification verification database providing eligibility-relevant information 242 comprising a governmental identification number.

Where applicable if eligibility-relevant information 242 does not match personally-identifiable information 228, such as a governmental identification number, potential recipient 16 is reverted to step 614 to correct the personally-identifiable information 228. If the one or more discrepancy persist or immediate after the discovery of the discrepancy, potential recipient 16 is invited via one or more communications from communications subsystem 282 to contact administrator 10, sponsor 20, and/or provided other information to aid in resolving the one or more discrepancies.

For example, in lending system 100a, database 244 may be one or more credit bureau credit worthiness databases providing eligibility-relevant information 242 in the form of a credit worthiness score. Eligibility-relevant information 242 may also be a validation of bank account information provided as personally-identifiable information 228.

In a step 622, recipient qualification unit 240 calculates whether a potential recipient 16 in sponsored applicant group 19 is eligible to receive benefit 12 using eligibility-relevant information 242 in accordance with criteria 246.

In accordance with one or more embodiments of the present invention, recipient qualification unit 240 determines eligibility based on eligibility-relevant information 242 that is payroll information from sponsor 20 and gross and net pay.

In accordance with one or more embodiments of the present invention, recipient qualification unit 240 determines eligibility based on eligibility-relevant information 242 that is a credit score, a specific debt amount, and income, and compares specific debt amount to income.

In order to become a benefit-eligible recipient 17, recipient 16 must meet criteria 246, which preferably include limits 209.

In a step 624, recipient qualification unit 240 calculates a quantity of benefit 12 that the benefit-eligible recipient 17 is eligible to receive from source 14. Recipient qualification unit 240 also preferably determines one or more benefit related factors 266 of benefit 12, which may be the length of the benefit, one or more repayment conditions, and the like.

Recipient qualification unit 240 may determine the quantity of benefit 12 using, for example, a percentage of the gross pay and/or net pay. The quantity of benefit 12 may also be determined using, for example, using the gross pay and credit information (e.g., eligibility-relevant information 242); therein, the better the credit information, such as having a better credit score increases the amount of benefit 12, such as the loan amount.

Figure 3C:
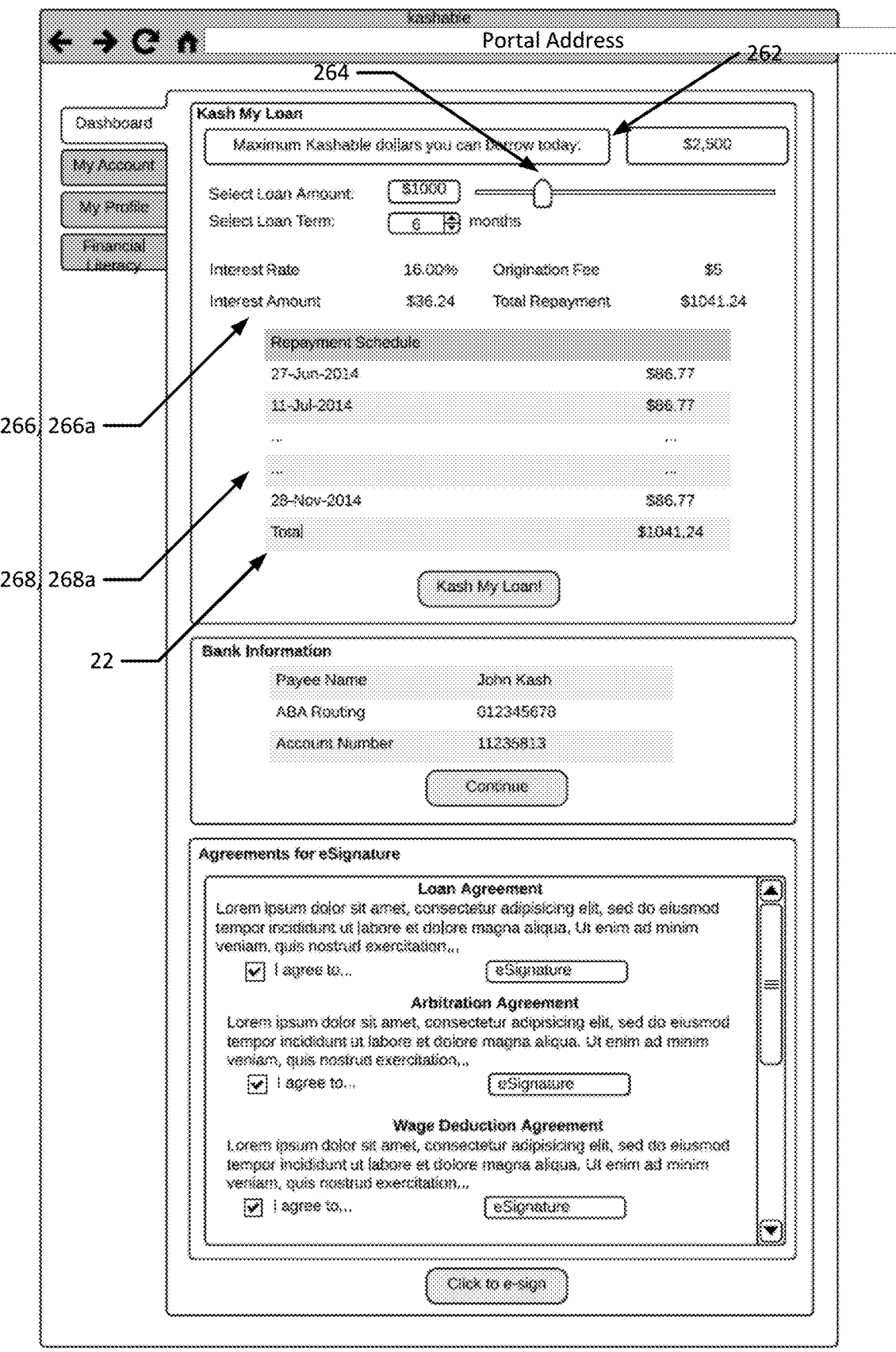
FIG. 3c is a schematic representation of a benefit eligibility display to benefit-eligible recipient in the benefit-provision system in accordance with one or more embodiments of the present invention.

FIG. 3c is a schematic representation of a benefit eligibility display to benefit-eligible recipient in the benefit-provision system in accordance with one or more embodiments of the present invention.

In a step 626, benefit administration unit 260 displays the quantity of benefit 12 that the benefit-eligible recipient 17 is eligible to receive relative one or more benefit related factors 266 via preferably a graphical interface 262 by system application interface 120 to the benefit-eligible recipient via participant terminal 110. Preferably, benefit administration unit 260 displays an interactive method of the quantity and benefit related factors 266 of benefit 12 that the benefit-eligible recipient 17 is eligible to receive relative one or more benefit related factors 266 via preferably a graphical interface 262 by system application interface 120 to the benefit-eligible recipient via participant terminal 110.

Graphical interface 262 may comprise at least one graphical benefit evaluator 264. Evaluator 264 preferably provides by any graphical representation that varies a measure of benefit 12 relative to one or more benefit related factors 266 and displays benefit relevant information 268 to benefit-eligible recipient 17 via participant terminal 110 on querying by the benefit-eligible recipient. Graphical benefit evaluator 264 is preferably linked to system application interface 120 in order to display in real-time benefit relevant information 268. If benefit 12 is a returnable and/or repayable benefit in whole or in part, benefit relevant information 268 may include a an indication or schedule of event dates and/or conditions, i.e., event occurrences 22, related to returning and/or repaying benefit 12.

In lending system 100a, graphical benefit evaluator 264 varies an amount of loan 12a and one or more benefit loan terms 266a and displays loan pertinent information 268a including interest rate, interest amount, schedule of repayments 22a due on repayment due dates and the amount of repayments, and other loan pertinent information to the benefit-eligible recipient. The terms and conditions may also indicate that if the benefit-eligible employee is no longer part of applicant group 19, i.e., sponsored workforce 19a, a termination repayment 24 in full of loan 12a and any accrued interest becomes due.

Graphical interface 262 may be a slider, a dial, or any other graphic convenient to illustrate the variability of a measure of benefit 12 relative to one or more benefit related factors 266.

If benefit-eligible recipient 17 changes or accepts the quantity of benefit 12 and/or benefit related factors 266 that are displayed, the benefit-eligible recipient indicates acceptance by using an acceptance indicator 270, which may be configured as a check box or a button. If benefit-eligible recipient 17 changed the quantity of benefit 12 and benefit related factors 266, the changed quantity of benefit 12 and/or changed benefit related factors 266 will be displayed benefit-eligible recipient 17 to make changes thereto until any changed quantity of benefit 12 and/or changed benefit related factors 266 are accepted.

In the alternative or in addition, at the same time or previous to acceptance one or more terms and conditions 228 may be displayed, which separately, at the same time, or instead of indicating acceptance via acceptance indicator 270, are accepted. The at least acknowledgment and/or acceptance of terms and conditions 228 are preferably recorded by terms-and-conditions subsystem 226. In the event of rejection of the terms and conditions 228, benefit-eligible recipient 17 is invited via one or more communications from communications subsystem 282 to contact administrator 10, sponsor 20, and/or provided other information to continue. In the alternative or in addition, method 600 may end.

In any event, any acknowledgement or acceptance of the terms and conditions is preferably stored in virtual data room 142 associated with applicant group 19 to which benefit-eligible recipient 17 is a member of or is associated and/or in virtual data room 142 associated with the sponsor of the applicant group.

In a step 628, benefit administration unit 260 causes benefit 12 to be issued to benefit-eligible recipient 17. If a benefit 12 is a tangible product, it may be mailed or delivered to an address provided in the personally-identifiable information 228 and/or made available in or through a store by issuance of an electronic code emailed to benefit-eligible recipient 17.

In lending system 100a, benefit administration unit 260 preferably causes loan 12a to be forwarded to a bank account, preferably a bank account identified in personally-identifiable information 228, using financial administration subsystem 284.

In a step 630, benefit administration unit 260 preferably causes to be forwarded, reminds, and/or receives without reminder at one or more predetermined times an updated qualifying information 206 regarding applicant group 19 from sponsor 20 to administrator 10 and preferably stored in virtual data room 142 associated with applicant group 19 and/or in virtual data room 142 associated with the sponsor of the applicant group.

For example, in system 100a, submitting updated qualifying information 206a comprising census information regarding workforce 18a determines which employees 20a may no longer be on the payroll, i.e., no longer be part of applicant group 19, i.e., sponsored workforce 19a, and causes a repayment event related to a termination repayment 24 to occur.

In a step 632, benefit administration unit 260 preferably causes to be forwarded, reminds, and/or receives without reminder, from a repayment or return of benefit 12 for each benefit-eligible recipient 17 who chose to receive benefit 12 if so desired.

In system 100a, benefit administration unit 260 causes to be forwarded, reminds, and/or receives without reminder, from employer 20a for each benefit-eligible employee 17a who chose to receive a loan 12a, a repayment 22 matching a required repayment amount specified in loan pertinent information 268a. Therein, employer 20 will deduct the wages of benefit-eligible employee 17a and using preferably financial administration subsystem 284 transfer to one or more system participants, preferably administrator 10 or source 14, repayment 22 matching a required repayment amount specified in loan pertinent information 268a for each benefit-eligible employee 17a who chose to receive loan 12a for the number of repayment occurrences specified in loan pertinent information 268a.

A system administration unit 280 may be functional in all steps of method 600 and includes a plurality of subunits.

System administration unit 280 preferably includes a communications subsystem 282. Communications subsystem 282 executes on one or more system hardware using one or more system software for communicating by the administrator with one or more system participants and/or for system participants to communicate among themselves or with the administrator using communications network 150 and/or any other suitable communications network now known or yet to be developed. For example, communications subsystem 282 may be an email system providing internet or intranet emails; the communications subsystem 282 may also include a text messaging system to send text message from one or more system participants to a cellular telephone of one or more other system participants. For example, communications subsystem 282 may include a chat system allowing instant messaging among one or more system participants.

Communications subsystem 282 preferably includes any suitable calendaring features, such as setting due dates and sending and/or displaying automated reminder notifications by one or more system participants for one another and/or for themselves.

System administration unit 280 preferably includes a financial administration subsystem 284. Financial administration subsystem 284 executes on one or more system hardware using one or more system software for providing accounting for system 10. Financial administration subsystem 284 includes one or more accounting software for maintaining an accounting of benefits 12 made to, refunds received from, funds paid to, compensation, or other accounting needs to one or more other system participants.

In lending system 100a, financial administration subsystem 284 preferably also includes one or more functional units to transfer loans funds 12a, individually or collectively, among one more system participants and/or their bank accounts. Therein, preferably updated eligibility-relevant information 242 is obtained by administrator 10 and saved to one or more databases and/or one or more virtual data rooms 142 on a predetermined and/or irregular schedule and utilize the updated information in system 100 and/or method 600. In the alternative or in addition, administrator 10 may obtain updates personally-identifiable information 228 on a predetermined and/or irregular schedule and utilize the updated information in system 100 and/or method 600.

System administration unit 280 preferably includes a terms-and-conditions subsystem 286. Terms-and-conditions subsystem 286 preferably is an editable database providing one or more terms and conditions 288 for use of one or more features of system 10. Terms-and-conditions subsystem 286 emails, displays, and/or brings to the attention of one or more system participant the terms and conditions 288 and records at least acknowledgment and/or acceptance, but preferably also rejection by that system participant by preferably a positive means, such as clicking, i.e., ticking, a check box.

In accordance with one or more embodiments of the present invention, terms-and-conditions subsystem 286 is able to control system 10 such that if the system participant agrees to terms and conditions 288, terms-and-conditions subsystem 286 permits the system participants to continue in system 10, or, if the system participant declines, terms-and-conditions subsystem 286 does not permit the system participant to continue in system 10 but rather causes a termination notice or other feature to be displayed to the system participant.

System administration unit 280 preferably includes a regulatory subsystem 290. Regulatory subsystem 290 comprises one or more databases and/or executable software that assure, in whole or in part, compliance for system 100 and method 600 with all applicable governmental, trade association, and industry rules and regulations.

System administration unit 280 preferably includes a support system 292. Support system 292 preferably provides a knowledge base that is accessible by one or more system participants while using any portion of system 100 or method 600 in whole or in part via application interface 120. Support system 292 also may include automated or live telephone service and/or one or more dedicated webpages accessible in whole or in part through application interface 120.

System administration unit 280 preferably includes an account access subsystem 294. Access subsystem 294 securely stores one or more data related to user accounts and passwords, such as user account 230, in one or more data centers 140 and permits one or more system participants to log into system 100 or 100a using the user account and password.

While the present invention has been described at some length and with some particularity with respect to the several described embodiments, it is not intended that it should be limited to any such particulars or embodiments or any particular embodiment, but it is to be construed to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A system for providing a benefit to a benefit-eligible recipient, wherein the benefit is provided by an administrator from a source to the benefit-eligible recipient, wherein a sponsor is sponsoring an access to the system for the benefit-eligible recipient, and wherein the sponsor and the source are separate entities, the system comprising:

a processor and a memory storing functional units, wherein the functional units comprise a qualification unit, a recipient qualification unit, and a benefit administration unit, and wherein the processor is configured to execute the functional units to perform the steps of:

calculating, by the qualification unit, an initial qualification score for an applicant group associated with the sponsor, wherein the initial qualification score is calculated based on a churn of the applicant group, wherein the initial qualification score is improved by a favorable churn of the applicant group associated with the sponsor, and wherein the benefit-eligible recipient is a member of the applicant group;

determining, by the qualification unit, whether the calculated initial qualification score meets a minimum initial qualification score as a condition to be sponsored by the sponsor and to access the system;

if the minimum initial qualification score is not achieved, repeating the step of calculating an initial qualification score for an applicant group associated with the sponsor with a different applicant group:

when the calculated initial qualification score meets the minimum initial qualification score, determining, by a recipient qualification unit, whether the benefit-eligible recipient is qualified to receive the benefit based on one or more benefit related factors;

when the benefit-eligible recipient is determined to be qualified to receive the benefit, generating, by a benefit administration unit, an information page comprising a graphical benefit evaluator, wherein the information page is displayed via an interactive communications network, wherein the graphical benefit evaluator is displayed in a graphical form and comprises a maximum amount of benefit available to the benefit-eligible recipient that is calculated based on the one or more benefit related factors, wherein the graphical benefit evaluator comprises a slider to allow choosing of an amount of benefit up to the maximum amount of benefit available to the benefit-eligible recipient and an acceptance indicator to allow indication of an acceptance of the chosen amount of benefit, and wherein the graphical benefit evaluator is responsive to changes in the one or more benefit related factors;

recalculating, by the benefit administration unit, the maximum amount of benefit available to the benefit-eligible recipient when there is a change in the one or more benefit related factors;

displaying in the slider, by the graphical benefit evaluator, the maximum amount of benefit available to the benefit-eligible recipient in real time;

choosing, by the benefit-eligible recipient adjusting the slider, an amount of benefit up to the maximum amount available to the benefit-eligible recipient; and accepting, by the benefit-eligible recipient using the acceptance indicator, the chosen amount of benefit.

2. The system of claim 1, further comprising:
saving, by a processor, the one or more benefit related factors in a database, wherein the one or more benefit related factors are retrieved from the database by the recipient qualification unit via interactive communications network, and wherein the database is a credit reporting database.

3. The system of claim 2, wherein the one or more benefit related factors are dependent on personally-identifiable information of the benefit-eligible recipient.

4. The system of claim 3, further comprising:
calculating, by the recipient qualification unit, a maximum amount of the benefit that the benefit-eligible recipient receives depending on the one or more benefit related factors.

5. The system of claim 1, further comprising:
providing, by wherein the benefit administration unit via the interactive communications network, an electronic code to the benefit-eligible recipient.

6. The system of claim 1, further comprising:
receiving the qualification unit from the sponsor via interactive communications network, qualifying information, wherein the qualifying information comprises at least one piece of information regarding the benefit-eligible recipient.

7. The system of claim 1, further comprising:
receiving, by the benefit administration unit, a repayment of the benefit from the benefit-eligible recipient via the sponsor.

8. The system of claim 1, wherein the initial qualification score is calculated according to:

$$IQS = FS*F1 + NE*F2 - CH*F3$$

where:
FS is a measure of financial soundness;
NE is the number of employees in an applicant group
CH is the churn in the applicant group;
FI is an adjustment factor applied to FS;
F2 is an adjustment factor applied to NE; and
F3 is an adjustment factor applied to CH.

9. The system of claim 1, further comprising:
calculating instantly, by the recipient qualification unit, whether the benefit-eligible recipient is qualified to receive the benefit.

10. The system of claim 1, further comprising:
a non-transitory computer-readable storage medium storing instructions for providing the benefit to the benefit-eligible recipient.

11. The system of claim 1, further comprising:
a non-transitory computer-readable storage medium storing instructions for providing the benefit to the benefit-eligible recipient, wherein the non-transitory computer-readable storage medium is associated with a cloud management service.

12. The system of claim 1, further comprising:
a non-transitory computer-readable storage medium storing instructions for providing the benefit to the benefit-eligible recipient, wherein the non-transitory computer-readable storage medium is associated with a data center.

13. The system of claim 1, further comprising:
a non-transitory computer-readable storage medium storing instructions for providing the benefit to the benefit-eligible recipient, wherein the non-transitory computer-readable storage medium is associated with a virtual data room.

14. A method for providing a benefit to a benefit-eligible recipient, wherein the benefit is provided by an administrator from a source to the benefit-eligible recipient, wherein a sponsor is sponsoring an access to the system for the benefit-eligible recipient, and wherein the sponsor and the source are separate entities, the method comprising:

calculating, by a qualification unit of a processor, an initial qualification score for an applicant group associated with the sponsor, wherein the initial qualification score is calculated based on a churn of the applicant group, wherein the initial qualification score is improved by a favorable churn of the applicant group associated with the sponsor, and wherein the benefit-eligible recipient is a member of the applicant group;

determining, by the qualification unit of the processor, whether the calculated initial qualification score meets a minimum initial qualification score as a condition to be sponsored by the sponsor and to access the system;

if the minimum initial qualification score is not achieved, repeating the step of calculating an initial qualification score for an applicant group associated with the sponsor with a different applicant group, when the calculated initial qualification score meets the minimum initial qualification score, determining, by a recipient qualification unit of the processor, whether the benefit-eligible recipient is qualified to receive the benefit based on one or more benefit related factors, when the benefit-eligible recipient is determined to be qualified to receive the benefit, generating, by a benefit administration unit of the processor, an information page comprising a graphical benefit evaluator, wherein the information page is displayed via an interactive communications network, wherein the graphical benefit evaluator is displayed in a graphical form and comprises a maximum amount of benefit available to the benefit-eligible recipient that is calculated based on the one or more benefit related factors, wherein the graphical benefit evaluator comprises a slider to allow choosing of an amount of benefit up to the maximum amount of benefit available to the benefit-eligible recipient and an acceptance indicator to allow indication of an acceptance of the chosen amount of benefit, and wherein the graphical benefit evaluator is responsive to changes in the one or more benefit related factors;

recalculating, by the benefit administration unit of the processor, the maximum amount of benefit available to the benefit-eligible recipient when there is a change in the one or more benefit related factors;

displaying in the slider, by the graphical benefit evaluator, the maximum amount of benefit available to the benefit-eligible recipient in real time;

choosing, by the benefit-eligible recipient adjusting the slider, an amount of benefit up to the maximum amount available to the benefit-eligible recipient; and accepting, by the benefit-eligible recipient using the acceptance indicator, the chosen amount of benefit.

15. The method of claim 14, further comprising:
saving, by the processor, the one or more benefit related factors to a database, wherein the one or more benefit related factors are retrieved from the database by the recipient qualification unit via interactive communications network, and wherein the database is a credit reporting database.

16. The method of claim 15, wherein the one or more benefit related factors are dependent on personally-identifiable information of the benefit-eligible recipient.

17. The method of claim 16, further comprising:
calculating, by the recipient qualification unit of the processor, a maximum amount of the benefit that the benefit-eligible recipient receives depending on the one or more benefit related factors.

18. The method of claim 14, further comprising:
providing, by the benefit administration unit of the processor via the interactive communications network, an electronic code to the benefit-eligible recipient.

19. The method of claim 14, further comprising:
receiving, by the qualification unit of the processor from the sponsor via interactive communications network, qualifying information, wherein the qualifying information comprises at least one piece of information regarding the benefit-eligible recipient.

20. The method of claim 14, further comprising:
receiving, by the benefit administration unit of the processor, a repayment of the benefit from the benefit-eligible recipient via the sponsor.

21. The method of claim 14, wherein the initial qualification score is calculated according to:

$$IQS=FS*FI+NE*F2-CH*F3$$

where:
FS is a measure of financial soundness;
NE is the number of employees in an applicant group
CH is the churn in the applicant group;
FI is an adjustment factor applied to FS;
F2 is an adjustment factor applied to NE; and
F3 is an adjustment factor applied to CH.

22. The method of claim 14, further comprising:
calculating instantly, by the recipient qualification unit of the processor, whether the benefit-eligible recipient is qualified to receive the benefit.

23. The method of claim 14, further comprising:
storing instructions for providing the benefit to the benefit-eligible recipient in a non-transitory computer-readable storage medium.

24. The method of claim 14, further comprising:
storing instructions for providing the benefit to the benefit-eligible recipient in a non-transitory computer-readable storage medium, wherein the non-transitory computer-readable storage medium is associated with a cloud management service.

25. The method of claim 14, further comprising:
storing instructions for providing the benefit to the benefit-eligible recipient in a non-transitory computer-readable storage medium, wherein the non-transitory computer-readable storage medium is associated with a data center.

26. The method of claim 14, further comprising:
storing instructions for providing the benefit to the benefit-eligible recipient in a non-transitory computer-readable storage medium, wherein the non-transitory computer-readable storage medium is associated with a virtual data room.

27. A non-transitory computer-readable storage medium storing instructions for providing a benefit to a benefit-eligible recipient, wherein the benefit is provided by an administrator from a source to the benefit-eligible recipient, wherein a sponsor is sponsoring an access to the system for the benefit-eligible recipient, and wherein the sponsor and the source are separate entities, that, when executed by a processor, cause the processor to perform operations comprising:

calculating, by a qualification unit of the processor, an initial qualification score for an applicant group associated with the sponsor, wherein the initial qualification score is calculated based on a churn of the applicant group, wherein the initial qualification score is improved by a favorable churn of the applicant group associated with the sponsor, and wherein the benefit-eligible recipient is a member of the applicant group;

determining, by the qualification unit of the processor, whether the calculated initial qualification score meets a minimum initial qualification score as a condition to be sponsored by the sponsor and to access the system;

if the minimum initial qualification score is not achieved, repeating the step of calculating an initial qualification score for an applicant group associated with the sponsor with a different applicant group, when the calculated initial qualification score meets the minimum initial qualification score, determining, by a recipient qualification unit of the processor, whether the benefit-eligible recipient is qualified to receive the benefit based on one or more benefit related factors;

when the benefit-eligible recipient is determined to be qualified to receive the benefit, generating, by a benefit administration unit of the processor, an information page comprising a graphical benefit evaluator, wherein the information page is displayed via an interactive communications network, wherein the graphical benefit evaluator is displayed in a graphical form and comprises a maximum amount of benefit available to the benefit-eligible recipient that is calculated based on the one or more benefit related factors, wherein the graphical benefit evaluator comprises a slider to allow choosing of an amount of benefit up to the maximum amount of benefit available to the benefit-eligible recipient and an acceptance indicator to allow indication of an acceptance of the chosen amount of benefit, and wherein the graphical benefit evaluator is responsive to changes in the one or more benefit related factors;

recalculating, by the benefit administration unit of the processor, the maximum amount of benefit available to the benefit-eligible recipient when there is a change in the one or more benefit related factors;

displaying in the slider, by the graphical benefit evaluator, the maximum amount of benefit available to the benefit-eligible recipient in real time;

choosing, by the benefit-eligible recipient adjusting the slider, an amount of benefit up to the maximum amount available to the benefit-eligible recipient; and accepting, by the benefit-eligible recipient using the acceptance indicator, the chosen amount of benefit.

28. The non-transitory computer-readable storage medium of claim 27, further compromising:

saving, by the processor, the one or more benefit related factors to a database, wherein the one or more benefit related factors are retrieved from the database by the recipient qualification unit via interactive communications network, and wherein the database is a credit reporting database.

29. The non-transitory computer-readable storage medium of claim 28, wherein the one or more benefit related factors are dependent on personally-identifiable information of the benefit-eligible recipient.

30. The non-transitory computer-readable storage medium of claim 29, further comprising:

calculating, by the recipient qualification unit of the processor, a maximum amount of the benefit that the benefit-eligible recipient receives depending on the one or more benefit related factors.

31. The non-transitory computer-readable storage medium of claim 27, further comprising:

providing, by the benefit administration unit of the processor via the interactive communications network, an electronic code to the benefit-eligible recipient.

32. The non-transitory computer-readable storage medium of claim 27, further comprising:

receiving, by the qualification unit of the processor from the sponsor via interactive communications network, qualifying information, wherein the qualifying information comprises at least one piece of information regarding the benefit-eligible recipient.

33. The non-transitory computer-readable storage medium of claim 27, further comprising:

receiving, by the benefit administration unit of the processor, a repayment of the benefit from the benefit-eligible recipient via the sponsor.

34. The non-transitory computer-readable storage medium of claim 27, wherein the initial qualification score is calculated according to:

$$IQS = FS*F1 + NE*F2 - CH*F3$$

where:

FS is a measure of financial soundness;

NE is the number of employees in an applicant group

CH is the churn in the applicant group;

FI is an adjustment factor applied to FS;

F2 is an adjustment factor applied to NE; and

F3 is an adjustment factor applied to CH.

35. The non-transitory computer-readable storage medium of claim 27, further comprising:

calculating instantly, by the recipient qualification unit of the processor, whether the benefit-eligible recipient is qualified to receive the benefit.

36. The non-transitory computer-readable storage medium of claim 27, wherein the non-transitory computer-readable storage medium is associated with a cloud management service.

37. The non-transitory computer-readable storage medium of claim 27, wherein the non-transitory computer-readable storage medium is associated with a data center.

38. The non-transitory computer-readable storage medium of claim 27, wherein the non-transitory computer-readable storage medium is associated with a virtual data room.

39. The non-transitory computer-readable storage medium of claim 27, wherein the non-transitory computer-readable storage medium is associated with a cloud management service.

* * * * *